United States Patent [19]

Hutchings

[11] 3,859,317

[45] Jan. 7, 1975

[54] PROCESS OF PREPARING P-BENZOQUINONE

[75] Inventor: David A. Hutchings, Stow, Ohio

[73] Assignee: The Goodyear Tire & Rubber Company, Akron, Ohio

[22] Filed: Sept. 28, 1973

[21] Appl. No.: 401,723

[52] U.S. Cl. ............................................. 260/396 R
[51] Int. Cl. ................................................ C07c 49/64
[58] Field of Search ................................. 260/396 R

[56] References Cited
UNITED STATES PATENTS 3,658,852   4/1972   Schuster et al. ................ 260/396 R Primary Examiner—Vivian Garner
Attorney, Agent, or Firm—F. W. Brunner; C. R. Schupbach

[57] ABSTRACT

This invention concerns a process for preparing p-benzoquinone by reacting phenol with oxygen in the presence of catalysts such as bis(salicylidene) ethylene diimino cobalt (II) using a solvent such as dimethylformamide.

7 Claims, 1 Drawing Figure

PATENTED JAN 7 1975
3,859,317
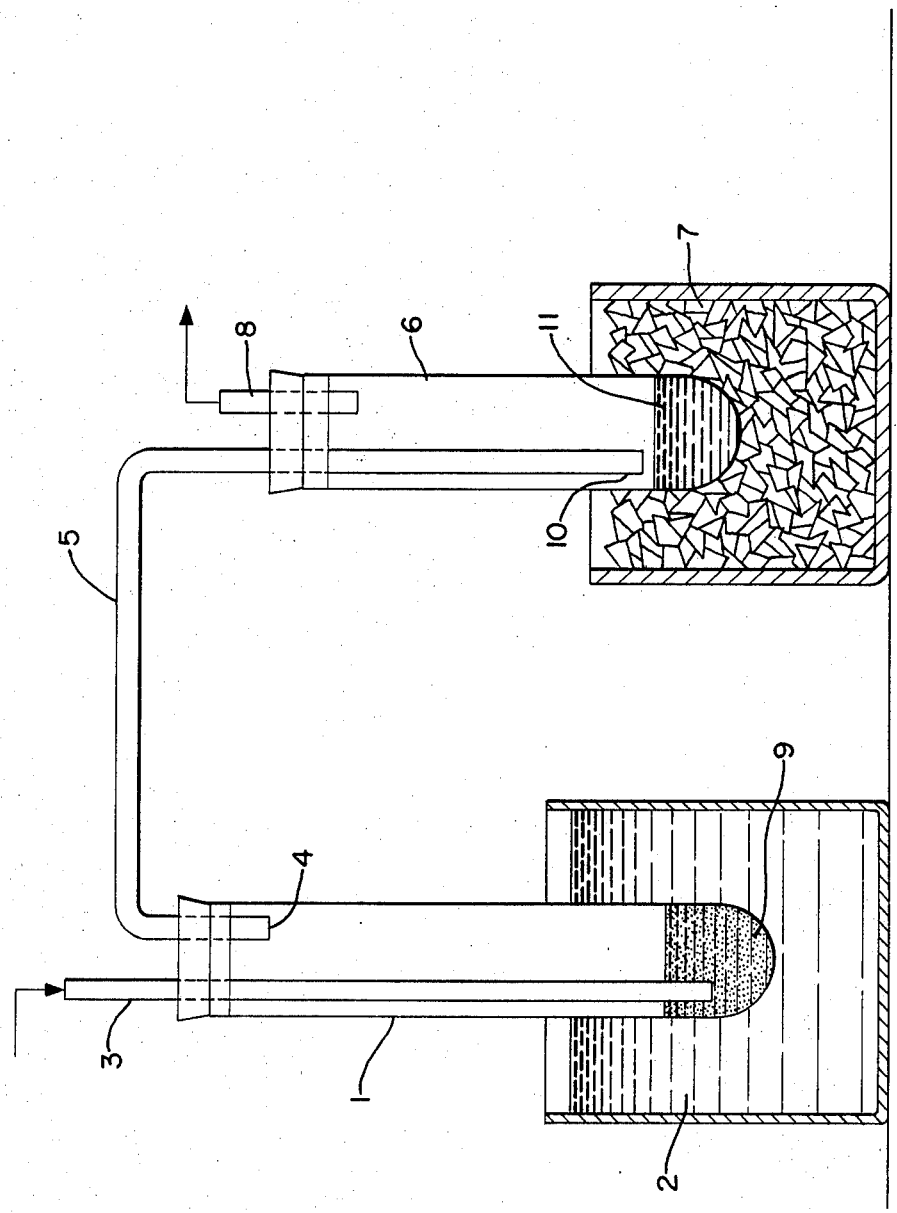

PROCESS OF PREPARING P-BENZOQUINONE

The present invention relates to the preparation of p-benzoquinone. More particularly it relates to the preparation of p-benzoquinone by reacting phenol with oxygen in the presence of catalysts and solvents.

p-Benzoquinone is currently produced by the oxidation of aniline using manganese dioxide in an aqueous sulfuric acid medium or by the oxidation of phenol using sodium dichromate and sulfuric acid medium. These methods are costly and require special handling techniques because of the highly corrosive chemicals used.

The prior art also describes attempts to use salcomine related or salen catalysts for the air oxidation of phenols. Without exception, these patents and papers indicate that phenol is attacked only very slowly or not at all by the salcomine-oxygen systems [J. Org. Chem. 35 2029 (1970), J. Org. Chem. 34 273 (1969)].

It is an object of the present invention to provide a simple and efficient process of preparing p-benzoquinone from phenol and oxygen. Other objects will become apparent as the description proceeds.

According to the present invention phenol can be oxidized by free oxygen in the presence of a coordination catalyst selected from the group consisting of:

bis(salicylidene)ethylenediimino cobalt (II)
bis(salicylidene)orthophenylenediimino cobalt (II)
bis(3-methoxysalicylidene)ethylenediimino cobalt (II)
bis(5-chlorosalicylidene)ethylenediimino cobalt (II)
bis(5-bromosalicylidene)ethylenediimino cobalt (II)
bis(salicylidene)propylene-1,2-diimino cobalt (II)
bis(salicylidene)2-methyl-1,2-diiminopropane cobalt (II)
bis(salicylidene)1,2-diiminocyclohexane cobalt (II)
bis(salicylidene)ethylenediimino manganese (II)
bis(salicylidene)orthophenylenediimino manganese (II)
bis(salicylidene)propylene-1,2-diimino manganese (II)
bis(salicylidene)1,2-diiminocyclohexane manganese (II)

In carrying out the process the phenol is dissolved in a solvent selected from the group consisting of (I) alkanols having from 1 to 4 carbon atoms, (II) benzonitrile, (III) hexamethyl phosphoric triamide, and (IV) N-alkyl substituted amides selected from the group consisting of N-methyl-2-pyrrolidone, diphenylformamide, dimethylformamide (DMF), cyclohexylmethylformamide and phenylmethylformamide, and (V) sulfoxides selected from the group consisting of dimethylsulfoxide (DMSO), phenylmethylsulfoxide, and cyclohexylmethylsulfoxide.

The process is generally run in the following manner. The desired amount of catalyst and phenol are dissolved in the solvent and placed in a reaction vessel. The order of addition of the catalyst and phenol to the solvent is not critical. Oxygen, air, or oxygen enriched air, is used as the oxidant. The oxidant is preferably introduced into the reactor through a sparger or system of spargers arranged in such a manner as to provide a maximum gas-liquid interface. The reactor is pressurized and heated to initiate the oxidation. After the reaction is complete, the solvent, unreacted phenol and benzoquinone product can be separated from the catalyst by solvent extraction.

The following example illustrates the preparation of salicylaldehyde diamine complex catalysts of Co(II) or Mn(II). [In this specification Co(II) designates cobalt in the cobaltous state and Mn(II) designates manganese in the manganous state.]

EXAMPLE 1

Five grams of salicylaldehyde and 1.52 grams of 1,2-diaminopropane were dissolved in 25 milliliters of ethyl alcohol. Sodium hydroxide in an amount of 1.6 grams and 4.85 grams of $CoCl_2 \cdot 6H_2O$ were dissolved in minimum amounts of water and added to the reaction mixture separately. The NaOH solution was added first followed by the $CoCl_2$ solution. A dark brown precipitate formed immediately on addition of the $CoCl_2$ solution. The precipitate was filtered and dried under vacuum at 100°C. to form bis(salicylidene)propylene-1,2-diimino cobalt (II).

The manganese complex of the salen catalyst can be prepared in exactly the same manner as described above except that 4.05 grams of $MnCl_2 \cdot 4H_2O$ is substituted for the 4.85 grams of $CoCl_2 \cdot 6H_2O$.

The bis(salicylidene)propylene-1,2-diimino cobalt-(II) catalyst is used as in the following example.

EXAMPLE 2

A 0.30 gram quantity of the catalyst bis(salicylidene)propylene-1,2-diimino cobalt(II) and 1.00 gram phenol were dissolved in 10 milliliters of dimethylformamide. A portion of the reaction mixture was charged into a micro-oxidation reactor. The reactor was heated to 75°C. under pressure of 200 pounds per square inch gauge (psig) pressure of $O_2$. After three hours reaction time, a yield of 40 percent p-benzoquinone was obtained.

Solvents which are illustrative of those preferred in the practice of the present invention include dimethylformamide, N-methyl-2-pyrrolidone, benzonitrile and hexamethylphosphoric triamide.

Although the prior art suggests that N-methyl-2-pyrrolidone is a good solvent for the oxidation of trimethyl phenol using oxygen and salcomine catalysts, the prior art does not appreciate the criticality of the solvent and catalyst as well as temperature necessary to provide adequate yields of p-benzoquinone from phenol.

When N-methyl-2-pyrrolidone is used as a solvent, the p-benzoquinone product can easily be removed from the system, continuously if desired, by distillation under reduced pressure. Thus N-methyl-2-pyrrolidone and p-benzoquinone can be distilled from the reacting mixture leaving the phenol behind as the phenol · N-methyl-2-pyrrolidone complex. The amount of N-methyl-2-pyrrolidone in the system need only be a sufficient concentration to complex the phenol which is present in a 1:1 ratio. The reaction temperature and pressure govern the rate at which the p-benzoquinone is separated from the N-methyl-2-pyrrolidone·phenol solution.

The examples below are given for illustrative purposes and are not intended to limit the scope of the invention.

EXAMPLE 3

Oxidation of phenol in N-methyl-2-pyrrolidone with continuous distillation of product The continuous distillative separation was run in the following manner. 1.0 Gram of phenol, 0.3 gram of bis(salicylidene)ethylenediimino cobalt(II), and 10 milliliters of N-methyl-2-pyrrolidone were charged into the reaction system shown in the attached Figure wherein a pyrex test tube reactor 1 was placed in an oil heating bath 2 and which was equipped with a glass inlet tube 3 and an outlet 4 leading to a glass connecting tube 5. The glass connecting tube 5 led to a cold trap 6 which was cooled by a dry ice-acetone mixture 7 and was itself equipped with outlet 8 for 180 gases to escape. Oxygen gas from a source not shown was bubbled through the reaction mixture 9 contained in pyrex test tube reactor 1 at the rate of 100 cubic centimeters per minute while the reaction mixture 9 was heated to between 90° C. and 100° C. by the oil bath 2. The oxygen stream, containing some p-benzoquinone and N-methyl-2-pyrrolidone, passes from pyrex test tube reactor 1 through the glass connecting tube 5. As the reaction proceeded, distillation of N-methyl-2-pyrrolidone continued. Condensate on the walls of the pyrex test tube reactor 1 turned yellow. Samples of the condensate collected at the outlet 4 of the pyrex test tube reactor 1 showed no phenol present. A yellow deposit which formed at the end 10 of the glass connecting tube 5 was mostly p-benzoquinone, the remainder being N-methyl-2pyrrolidone. Condensate 11 collected in the cold trap 6 was N-methyl-2-pyrrolidone with a trace of p-benzoquinone. This separation showed that a simple reactor distillation apparatus was capable of separating the phenol, p-benzoquinone and N-methyl-2-pyrrolidone.

As shown above N-methyl-2-pyrrolidone allows for continuous removal of product by a continuous distillation procedure. When solvents other than N-methyl-2-pyrrolidone are used, p-benzoquinone can be separated from the reaction mixture by standard extractive techniques. For example, when dimethylformamide is used, isopentane is added to the reaction mixture to form a two-phase system with the p-benzoquinone in solution with the isopentane. The phases are separated and the isopentane is evaporated to leave the p-benzuinone product behind.

The preparation of a catalyst of the invention has been illustrated. Other catalysts can be obtained by this or one of the following techniques: 1. The Schiff base is prepared in a pure state by combining the salicylaldehyde or substituted salicylaldehyde with the desired amine in ethyl alcohol, precipitating, and drying the resulting adduct. The Schiff base is then dissolved in water containing sufficient sodium hydroxide to neutralize most of the phenolic functions on the Schiff base. An amount of $CoCl_2 \cdot 6 H_2O$ or $MnCl_2 \cdot 4 H_2O$ equivalent to the Schiff base concentration is added to the reaction mixture resulting in a precipitate which is filtered and dried. 2. The Schiff base is prepared by combining salicylaldehyde and amine in alcohol with no attempt to separate the Schiff base. A quantity of sodium hydroxide sufficient to neutralize the phenolic functions of the Schiff base is dissolved in a minimum amount of water necessary to effect solution at room temperature and added to the alcohol solution followed by the addition of an amount of $CoCl_2 \cdot 6H_2O$ or $MnCl_2 \cdot 4H_2O$ equivalent to the Schiff base, i.e., 2:1 molar ratio of Schiff base to metal, dissolved in a minimum amount of water. The resulting precipitate is filtered and dried.

When alcohol is used as a solvent, yields of the catalytic complex are improved by distilling off some of the alcohol before filtration. 3. The Schiff base is placed in a minimum amount of alcohol or preferably without a solvent by direct combination of salicylaldehyde and diamine. A quantity of cobalt acetate $[Co(OAc)_2]$ or manganese acetate $[Mn(OAc)_2]$ equivalent to the Schiff base is dissolved in pyridine. The Schiff base is slowly added to the Co(II) pyridine or Mn(II) pyridine solution. The pyridine is then distilled from the reaction mixture leaving the complex behind.

Some additional techniques have been found useful in the practice of this invention. Oxidant bubbled through the reaction apparatus can be recycled, if desired. The pressure of the oxidant gas can be elevated, but gas pressures yielding a partial pressure of contained oxygen above about 10 atmospheres do not appear to affect conversion levels. Mechanical mixing can be used to increase the gas-liquid interface in the reactor above the level caused by sparging oxygen into the system.

The reaction is carried out preferably at a temperature of from 45°C. to 150°C., most preferably from 60° C. to 110° C. The reactor pressure is preferably from 1 to 30 atmospheres, more preferably from 1 to 20 atmospheres.

The catalyst level can vary widely from about 0.001 mole of catalyst per mole of phenol to about 5.00 moles of catalyst per mole of phenol. Preferably the catalyst level is at least 0.10 mole per mole of phenol and not in excess of 2.00 moles of catalyst per mole of phenol. The concentration of phenol in the solvent can be as low as 0.001 gram of phenol per gram of solvent and as high as 10 grams of phenol to 1 gram of solvent, but preferably at least 0.01 gram of phenol per gram of solvent is used and up to about 1.0 gram of phenol per gram of solvent is used.

While certain representative embodiments and details have been shown for the purpose of illustrating the invention, it will be apparent to those skilled in this art that various changes and modifications may be made herein without departing from the spirit or the scope of this invention.

I claim:

1. A process comprising reacting a solution of phenol in a solvent with free oxygen at a temperature of from 45° C. to 150° C. and a reactor pressure of from 1 to 30 atmospheres in the presence of a catalytic amount of catalyst selected from the group consisting of bis(salicylidene)ethylenediimino cobalt (II)
bis(salicylidene)orthophenylenediimino cobalt (II)
bis(3-methoxysalicylidene)ethylenediimino cobalt (II)
bis(5-chlorosalicylidene)ethylenediimino cobalt (II)
bis(5-bromosalicylidene)ethylenediimino cobalt (II)
bis(salicylidene)propylene-1,2-diimino cobalt (II)
bis(salicylidene)2-methyl-1,2-diiminopropane cobalt (II)
bis(salicylidene)1,2-diiminocyclohexane cobalt (II)
bis(salicylidene)ethylenediimino manganese (II)
bis(salicylidene)orthophenylenediimino manganese (II)
bis(salicylidene)propylene-1,2-diimino manganese (II)
bis(salicylidene)1,2-diiminocyclohexane manganese (II), said solvent being selected from the group consisting of (I) alkanols having from 1 to 4 carbon atoms, (II) benzonitrile, (III) hexamethyl phosphoric triamide, (IV) N-alkyl substituted amides selected from the group consisting of N-methyl-2-pyrrolidone
diphenylformamide
dimethylformamide (DMF)
cyclohexylmethylformamide
phenylmethylformamide,
and (V) sulfoxides selected from the group consisting of
dimethylsulfoxide (DMSO)
phenylmethylsulfoxide
cyclohexylmethylsulfoxide.

2. A process according to claim 1 wherein the solvent is selected from the group consisting of dimethylformamide, N-methyl-2-pyrrolidone, benzonitrile and hexamethyl phosphoric triamide.

3. A process according to claim 2 wherein the reaction takes place at a temperature of 60° C. to 110° C.

4. A process according to claim 3 wherein the reaction takes place at a reaction pressure of 1 to 20 atmospheres.

5. A process according to claim 4 wherein the catalyst is present at a concentration of from 0.10 mole to 2.00 moles per mole of phenol.

6. A process according to claim 1 wherein the solvent is N-methyl-2-pyrrolidone and continuous distillation is used to separate benzoquinone from the p-benzoquinone-phenol-catalyst mixture.

7. A process according to claim 1 wherein the catalyst is bis(salicylidene) ethylenediimino cobalt (II) present at from 0.10 mole to 2.00 moles per mole of phenol, the solvent is dimethylformamide and wherein the reaction takes place between 60° C. and 110° C. and from 1 to 20 atmospheres pressure of oxygen bearing gas.

* * * * *